(12) United States Patent
Eisenmenger et al.

(10) Patent No.: US 10,247,048 B2
(45) Date of Patent: Apr. 2, 2019

(54) GATE VALVE

(71) Applicant: Robert Bosch GmbH, Stuttgart (DE)

(72) Inventors: Nadja Eisenmenger, Stuttgart (DE); Sophie-Charlotte Deger-Panthene, Stuttgart (DE); Steffen Buhl, Sachsenheim-Spielberg (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 15/484,007

(22) Filed: Apr. 10, 2017

(65) Prior Publication Data

US 2017/0292625 A1  Oct. 12, 2017

(30) Foreign Application Priority Data

Apr. 12, 2016 (DE) .................... 10 2016 206 089

(51) Int. Cl.
*F16K 3/24* (2006.01)
*F16K 3/26* (2006.01)
*F01K 23/10* (2006.01)
*F16K 31/126* (2006.01)

(52) U.S. Cl.
CPC ............. *F01K 23/10* (2013.01); *F16K 3/24* (2013.01); *F16K 3/267* (2013.01); *F16K 31/1262* (2013.01); *Y02P 80/152* (2015.11)

(58) Field of Classification Search
CPC .. F01K 23/00–23/18; F16K 3/00; F16K 3/02; F16K 3/0209; F16K 3/0254; F16K 3/029; F16K 3/03; F16K 3/24; F16K 3/26; F16K 3/262; F16K 3/32; F16K 11/06–11/0716; F16K 31/12; F16K 31/122; F16K 31/1221; F16K 31/1223; F16K 31/1226; F16K 31/1262

USPC ..... 60/614–620; 251/5, 12, 14, 22, 58, 61.2, 251/61.5, 63.5, 73, 129.03, 129.07, 149.9, 251/153, 175, 193, 226, 318–329

See application file for complete search history.

(56) References Cited

U.S. PATENT DOCUMENTS

| | | | | |
|---|---|---|---|---|
| 4,044,992 | A * | 8/1977 | Jukoff | F16K 47/06 138/43 |
| 4,688,601 | A * | 8/1987 | Astill | F16K 31/506 137/238 |
| 2009/0230336 | A1* | 9/2009 | Laverdiere | G05D 16/2013 251/14 |
| 2011/0203278 | A1* | 8/2011 | Kopecek | F01K 25/10 60/660 |
| 2013/0074497 | A1* | 3/2013 | Mori | F01K 23/10 60/615 |

(Continued)

FOREIGN PATENT DOCUMENTS

DE      102014224979      6/2016

*Primary Examiner* — Mark A Laurenzi
*Assistant Examiner* — Mickey H France
(74) *Attorney, Agent, or Firm* — Michael Best & Friedrich LLP

(57) ABSTRACT

Gate valve (1) with a valve casing (4) and a closing body (3) arranged longitudinally movably in the valve casing (4). An inlet channel (5) and an outlet channel (6) are formed in the valve casing (4). The closing body (3) via longitudinal movement cooperates with a valve seat (8) formed in the valve casing (4) and hence opens and closes a hydraulic connection between the inlet channel (5) and the outlet channel (6). The inlet channel (5) and the outlet channel (6) are each formed as a spiral.

10 Claims, 5 Drawing Sheets

(56) References Cited

U.S. PATENT DOCUMENTS

2016/0084038 A1\* 3/2016 Husveg .................. F16K 47/12
137/601.15

\* cited by examiner

GATE VALVE

BACKGROUND OF THE INVENTION

The invention concerns a gate valve, such as a gate valve used in a waste heat recovery system of an internal combustion engine.

Many designs of valves are known in the prior art.

A known gate valve comprises a valve casing and a closing body arranged longitudinally movably in the valve casing. An inlet channel and an outlet channel are formed in the valve casing. The closing body in its longitudinal movement cooperates with a valve seat formed on the valve casing, and opens and closes a hydraulic connection between the inlet channel and the outlet channel. Such a valve is known for example from application DE 10 2014 224979 A1 not previously published.

The closing body of the known gate valve is subjected to comparatively high transverse forces from the flows occurring.

SUMMARY OF THE INVENTION

In comparison, the gate valve according to the invention has lower transverse forces. Therefore the closing body and valve seat are subject to less wear, whereby the service life of the entire gate valve is extended. Furthermore, the reduction in transverse forces also leads to a reduction in the pressure loss, increasing the efficiency of the gate valve.

For this, the gate valve comprises a valve casing and a closing body arranged longitudinally movably in the valve casing. An inlet channel and an outlet channel are formed in the valve casing. The closing body in its longitudinal movement cooperates with a valve seat formed in the valve casing and hence opens and closes a hydraulic connection between the inlet channel and the outlet channel. The inlet channel and the outlet channel are each formed as a spiral.

Due to the spiral or scroll form of the inlet and outlet channel, when the hydraulic connection is opened, a fluid flows substantially tangentially around the periphery of the closing body. The closing body is here preferably formed substantially rotationally symmetrically. The transverse forces from the radial contact flow on the closing body are thus reduced. The closing body is deflected less greatly from its axially central position, so that on opening and closing of the hydraulic connection, lower contact pressures occur between the closing body and its contact partners and hence the wear is reduced.

In advantageous embodiments, the hydraulic connection comprises a peripheral groove formed on the closing body. The peripheral groove on the closing body is easy to produce. Furthermore, in this way the moved mass of the closing body is reduced, increasing the dynamics of the gate valve.

In advantageous refinements, the flow cross-section through the hydraulic connection is 1.2 to 1.5 times the flow cross-section through the inlet channel. This prevents a hydraulic connection from forming a choke point. The risk of cavitation damage to the closing body and valve seat is thus minimized.

Preferably, the spiral forms of the inlet channel and outlet channel run over 360° of the periphery of the closing body. In this way, the fluid flow in the regions close to the closing body is oriented such that it runs mainly in the tangential direction. Hydraulically resulting transverse forces on the closing body are therefore minimized.

In advantageous refinements, a further outlet channel is formed in the valve casing. The closing body in its longitudinal movement cooperates with a further valve seat formed in the valve casing and hence opens and closes a further hydraulic connection between the inlet channel and the further outlet channel. According to the invention, the further outlet channel is also formed as a spiral. Due to the spiral or scroll form of the further outlet channel, also when the further hydraulic connection is opened, the fluid is conducted substantially tangentially around the periphery of the closing body. The transverse forces from the radial contact flow on the closing body are thus reduced. The closing body is deflected less greatly from its axially central position, so that on opening and closing of the further hydraulic connection, lower contact pressures occur between the closing body and its contact partners and hence the wear is reduced.

In advantageous embodiments of the gate valve, a continuous bore is formed in the closing body. The continuous bore is hydraulically connected to the inlet channel so that the end faces on each side of the closing body are loaded with a hydraulic pressure of the inlet channel. Thus a pressure-balanced gate valve is achieved, i.e. the hydraulically resulting force on the closing body is reduced greatly, ideally almost to zero. Thus the closing body can be actuated very dynamically, and the gate valve can open and close the hydraulic connection—and optionally also the further hydraulic connection—very quickly.

In an advantageous embodiment, the gate valve according to the invention is arranged in a waste heat recovery system of an internal combustion engine. The waste heat recovery system has a circuit conducting a working medium, wherein the circuit comprises, in the flow direction of the working medium, a pump, an evaporator, a bypass valve, an expansion machine and a condenser. A bypass line is arranged in parallel to the expansion machine, wherein the bypass valve controls the mass flow of the working medium to the expansion machine and to the bypass line. The bypass valve is the gate valve according to the invention. In this way, the mass flow of the working medium can be divided arbitrarily between the expansion machine and the bypass line. The division may for example depend on the degree of evaporation of the working medium, or on the temperature of the working medium.

In order to achieve a high efficiency of the waste heat recovery system, it is necessary to convey the working medium from the evaporator to the expansion machine without significant pressure losses. Preferably, the expansion machine is therefore connected to the outlet channel. The gate valve according to the invention is particularly suitable for this. Furthermore, waste heat recovery systems use very aggressive working media, whereby components such as the closing body or valve seat, which are at particular risk of wear, may be subjected to a very high load. If for example corrosion protection layers are used, these are worn away to a far lesser degree in the gate valve according to the invention, whereby the corrosion protection is maintained for longer.

DETAILED DESCRIPTION

Figure 1:
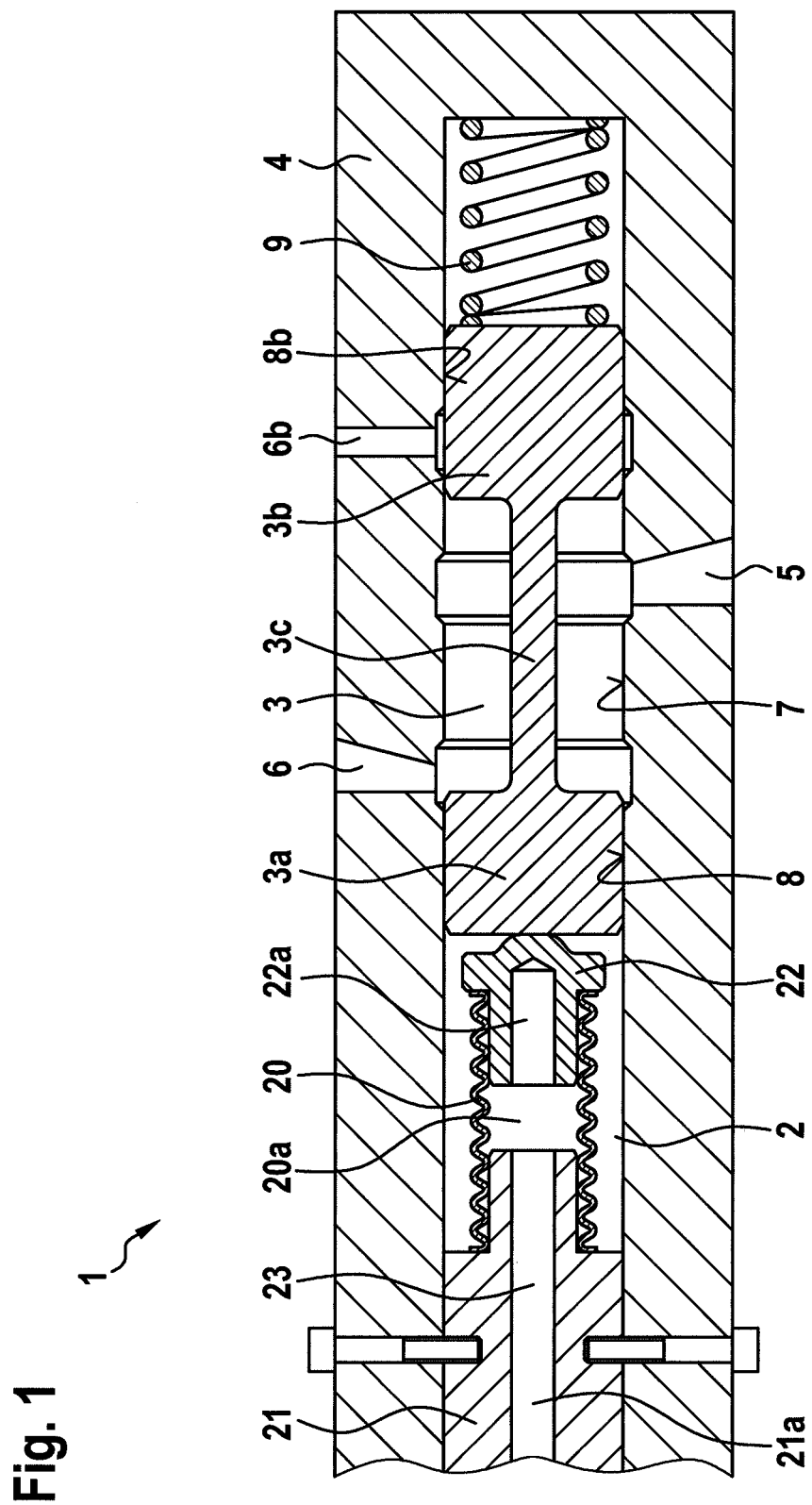
FIG. 1 shows a longitudinal section of an exemplary embodiment of the gate valve according to the invention, wherein only the essential regions are depicted.

FIG. 1 shows a longitudinal section of a gate valve 1 according to the invention, wherein only the essential regions are depicted. The gate valve 1 comprises a valve casing 4 and is driven by a metal bellows-cylinder unit 2. Many alternative drives are possible, for example an electromechanical drive or a piezo-electric drive. An inlet channel 5, an outlet channel 6 and a further outlet channel 6b are formed in the valve casing 4, so that in this embodiment, the gate valve 1 is configured as a 3-way directional control valve. Furthermore, a housing bore 7 is formed in the valve casing 4, into which the inlet channel 5 and both outlet channels 6, 6b open.

A closing body 3 is arranged longitudinally movably in the housing bore 7 for opening and closing the two outlet channels 6, 6b. The closing body 3 here comprises a closing cylinder 3a, a further closing cylinder 3b and a connecting bolt 3c for connecting the two closing cylinders 3a, 3b. The closing cylinder 3a, the further closing cylinder 3b and the connecting bolt 3c may be formed as one piece but also as multiple pieces. Advantageously, the closing body 3 is formed so as to be substantially rotationally symmetrical.

The metal bellows-cylinder unit 2 comprises a first cylinder 22, a second cylinder 21 and a metal bellows 20. The first cylinder 22 and the second cylinder 21 are arranged movably relative to each other in the axial direction, and are connected together mechanically by the metal bellows 20 and sealed towards the outside by the latter. The first cylinder 22 is arranged longitudinally movably in the housing bore 7. The second cylinder 21 is arranged fixedly on the valve casing 4.

A cylinder bore 21a is formed in the second cylinder 21, and a blind bore 22a is formed in the first cylinder 22. The metal bellows 20 is arranged at least partially surrounding the first cylinder 22 and the second cylinder 21, so that the interior of the metal bellows 20 is hydraulically connected to the cylinder bore 21a and to the blind bore 22a, thus forming a working chamber 23. The working chamber 23 thus comprises the cylinder bore 21a, the blind bore 22a and an additional volume 20a which is formed in the interior of the metal bellows 20 and is variable because of the expansion capacity of the metal bellows 20. Preferably, the metal bellows 20 is made from a thin, easily deformable metal.

The closing cylinder 3a cooperates with the first cylinder 22 of the metal bellows-cylinder unit 2. Alternatively, the closing cylinder 3a and the first cylinder 22 may also be formed integrally. The second cylinder 21 is fixedly bolted to the valve casing 4.

A valve seat 8 and a further valve seat 8b are formed on the valve casing 4, wherein the valve seat 8 surrounds the outlet channel 6 and the further valve seat 8b surrounds the further outlet channel 6b. In the exemplary embodiment of FIG. 1, the valve seat 8 and the further valve seat 8b are configured as part regions of the housing bore 7. The closing cylinder 3a cooperates with the valve seat 8, and the further closing cylinder 3b cooperates with the further valve seat 8b.

The closing body 3 is pressed by a valve spring 9 arranged in the housing bore 7 to the left in the depiction of FIG. 1, against the thrust direction of the metal bellows 2, and hence opens a hydraulic connection from the inlet channel 5 to the outlet channel 6 and closes a further hydraulic connection from the inlet channel 5 to the further outlet channel 6b; this valve position is shown in the depiction in FIG. 1. When the working chamber 23 is filled with a working fluid, the metal bellows-cylinder unit 2 expands against the spring force of the valve spring 9, the closing cylinder 3a covers the valve seat 8, and the further closing cylinder 3b opens the further valve seat 8b, so that the hydraulic connection is closed and the further hydraulic connection is opened. When the working chamber 23 is evacuated, the metal bellows-cylinder unit 2 is compressed by the spring force of the valve spring 9, and the closing body 3 is pushed back into the starting position so that the hydraulic connection is opened and the further hydraulic connection is closed.

According to the invention, the inlet channel 5 and the outlet channel 6 are configured as a spiral or ring or scroll, wherein the ring forms of the inlet channel 5 and outlet channel 6 each extend over more than 180° of the periphery of the gate valve 1, preferably 360°. The preferred flow direction of the gate valve 1 is from the inlet channel 5 to the outlet channel 6. Due to the spiral form of the inlet channel 5 and outlet channel 6, a very favorable flow geometry results for the hydraulic connection. Thus the pressure loss when a working medium flows through the hydraulic connection is minimized, since the spiral form of the inlet channel 5, because of the cross-section reduction, ensures an even supply of working medium via the periphery to the valve cross-section and its evacuation via the correspondingly spiral outlet channel 6. The swirl of the flow is thus maintained so that the flow is hindered or deflected as little as possible. In this way, disadvantageous transverse forces on the closing body 3 are also minimized since the flow passes evenly over the periphery of the closing body 3, whereby radial forces are prevented because there are no local pressure differences.

In advantageous refinements, a further outlet channel 6b may be configured as a spiral in order to minimize the pressure losses on flow through the second hydraulic connection.

Figure 2:
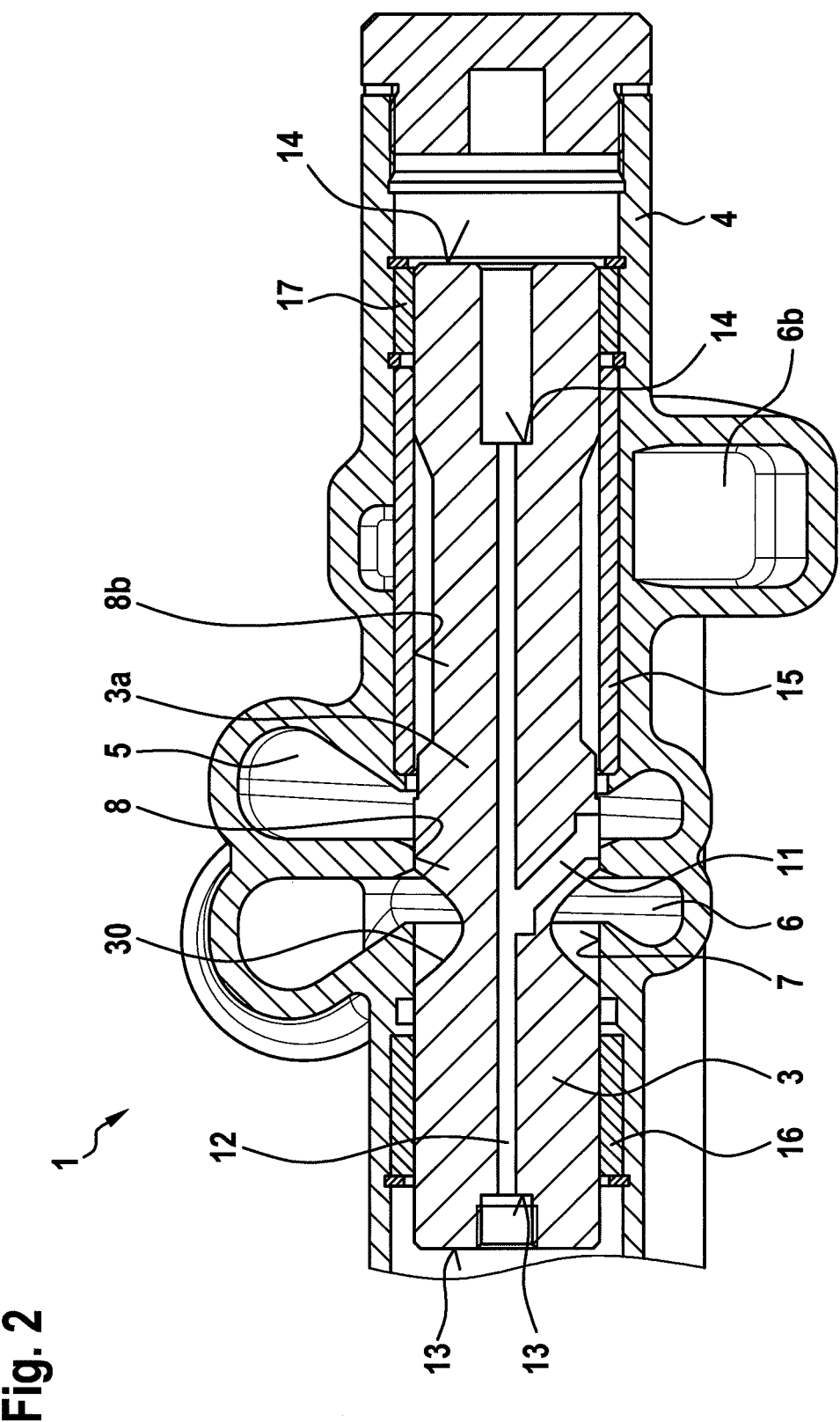
FIG. 2 shows a longitudinal section of a further exemplary embodiment of the gate valve according to the invention, wherein only the essential regions are depicted.

FIG. 2 shows a longitudinal section of a further exemplary embodiment of the gate valve 1 according to the invention, wherein only the essential regions are depicted.

In the embodiment of FIG. 2, the gate valve 1 is also configured as a 3-way valve. The closing body 3 comprises the closing cylinder 3a which cooperates both with the valve seat 8 for opening and closing the hydraulic connection, and with the further valve seat 8b for opening and closing the further hydraulic connection. Here, the two valve seats 8, 8b are arranged cylindrically. Viewed in the axial direction of the closing body 3, the valve seat 8 is arranged on the one side adjacent to the spiral inlet channel 5, and the further valve seat 8b is arranged on the other side.

In the embodiment of FIG. 2, the further valve seat 8b is formed as an inner face of a valve tube 15 pressed into the valve casing 4, i.e. as a gate valve seat. Radial bores (not shown in detail) are formed in the valve tube in order, when the further hydraulic connection is opened, to guarantee a through-flow of fluid from the inlet channel 5 through the further valve seat 8b to the further outlet channel 6b. In this exemplary embodiment, the further outlet channel 6b is also formed as a ring or spiral.

Next to the closing cylinder 3a, a peripheral groove 30 is formed on the closing body 3 which constitutes a diameter reduction of the closing body 3. When the closing cylinder 3a clears the valve seat 8, the peripheral groove 30 is arranged radially opposite the valve seat 8. The hydraulic connection from the inlet channel 5 to the outlet channel 6 then runs via the peripheral groove 30.

The gate valve 1 in FIG. 2, configured as a 3-way valve, is designed with pressure balance. For this, a continuous bore 12 and a connecting bore 11 are formed in the closing body 3. In any position of the closing body 3, the connecting bore 11 is hydraulically connected to the inlet channel 5 and opens into the continuous bore 12. The continuous bore 12 emerges from the substantially cylindrical closing body 3 at both ends, so that the end faces 13, 14 on both sides of the closing body 3 are loaded with the fluid pressure of the inlet channel 5. Sealing sleeves 16, 17 arranged surrounding the closing body 3 on both ends block fluid connections from the two end faces 13, 14 to the two outlet channels 6, 6b.

If the continuous bore 12 is configured stepped as shown in FIG. 2, the respective ring faces also form part of the end faces 13, 14 of the corresponding outlet side. If the two end faces 13, 14 now have the same area, the closing body 3 is pressure-balanced, i.e. the resulting hydraulic force acting thereon is zero in the axial direction.

Figure 3:
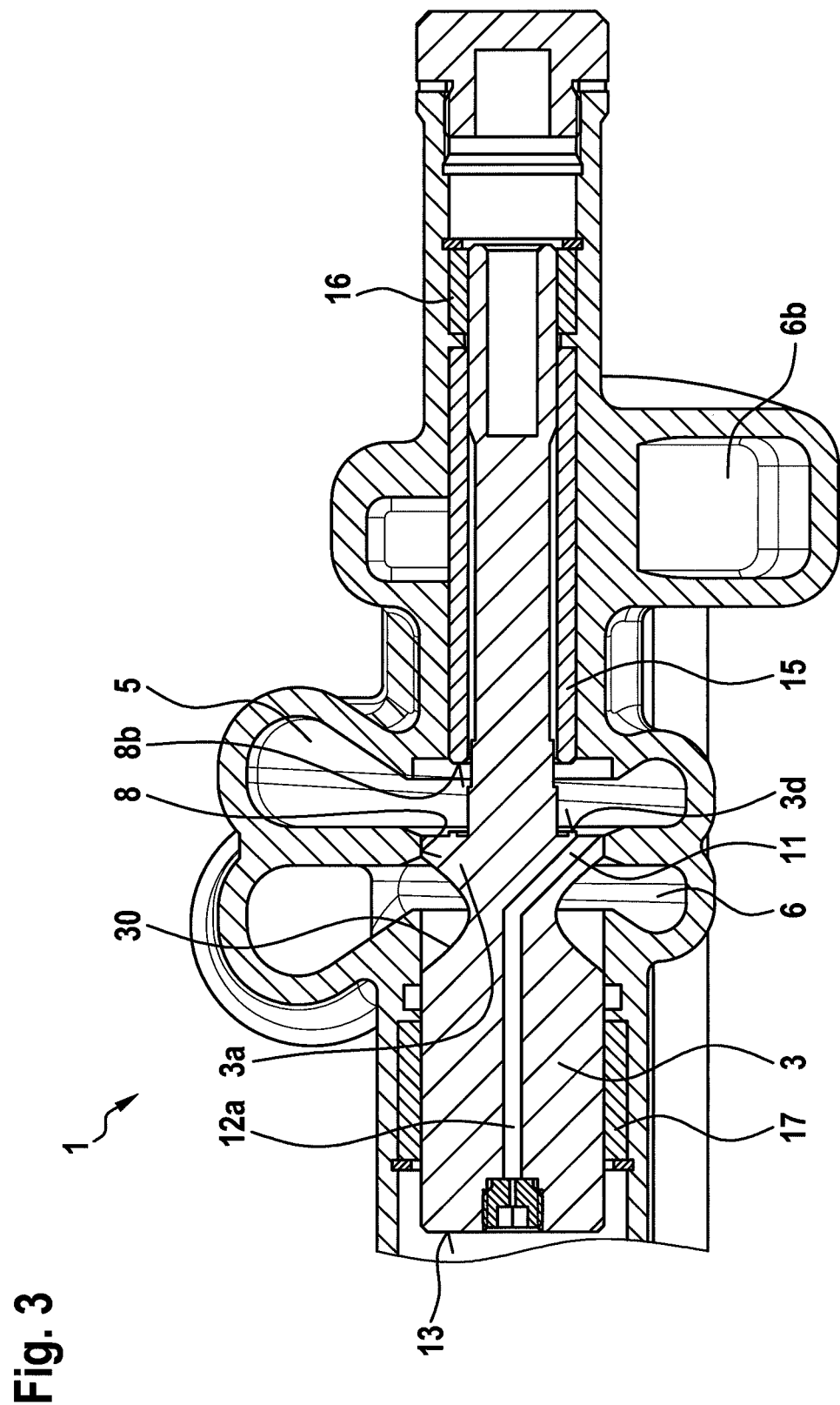
FIG. 3 shows a longitudinal section of yet a further exemplary embodiment of the gate valve according to the invention, wherein only the essential regions are depicted.

FIG. 3 shows a longitudinal section of yet a further exemplary embodiment of the gate valve 1 according to the invention, wherein only the essential regions are depicted. The exemplary embodiment of FIG. 3 is similar to that of FIG. 2, so only the differences are described below.

In the embodiment of FIG. 3, the further valve seat 8b is also configured as a flat valve seat. The further valve seat 8b is formed as a peripheral valve seat lug on the end face of the valve tube 15. Alternatively, the further valve seat 8b may also be formed on the valve casing 4. On one end face of the closing cylinder 3a, a peripheral closing lug 3d is formed on the closing body 3 which cooperates with the valve seat 8b to open and close the further hydraulic connection.

The embodiment of the gate valve 1 of FIG. 3 is not pressure-balanced, but configured such that the hydraulically resulting force acts so as to attempt to open the hydraulic connection from the inlet channel 5 to the outlet channel 6 and close the further hydraulic connection from the inlet channel 5 to the further outlet channel 6b. For this, the connecting bore 11 and a connecting channel 12a are formed in the closing body so that only one end face 13 of the closing body 3 is hydraulically connected to the inlet channel 5, and consequently also loaded with the pressure prevailing there. In the embodiment of FIG. 3, this is the end face 13 lying closer to the outlet channel 6.

Figure 4:
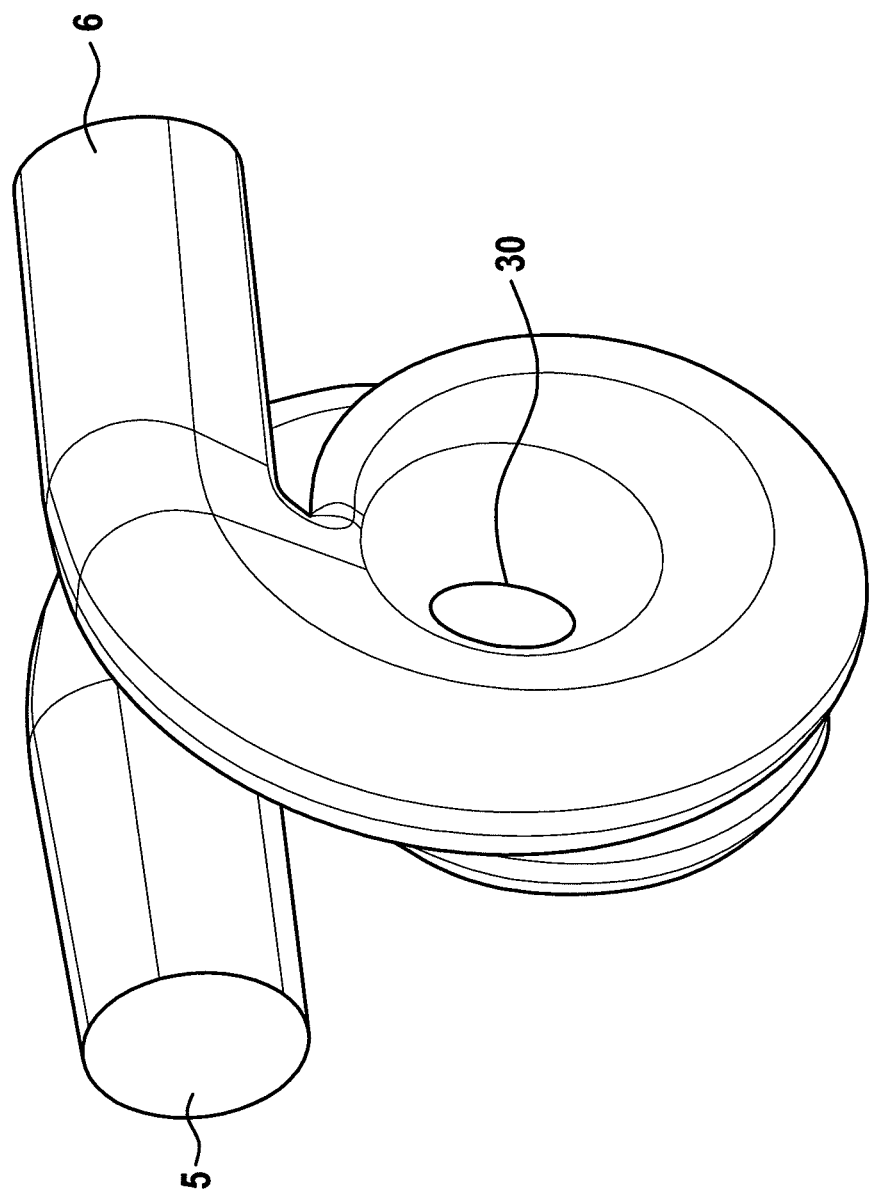
FIG. 4 shows the flow geometry of a fluid through the inlet channel and outlet channel of the gate valve according to the invention.

FIG. 4 shows the flow geometry of the fluid through the inlet channel 5, the peripheral groove 30 and the outlet channel 6 of the gate valve 1 according to the invention when the hydraulic connection is open. The spiral or scroll forms of the inlet channel 5 and outlet channel 6 run over 360° and are connected together by the substantially annular peripheral groove 30 as long as the hydraulic connection is open.

In advantageous embodiments, the flow cross-section through the hydraulic connection or peripheral groove 30, at its smallest point, is 1.2 to 1.5 times the flow cross-section of the inlet channel 5, preferably 1.4 times.

Figure 5:
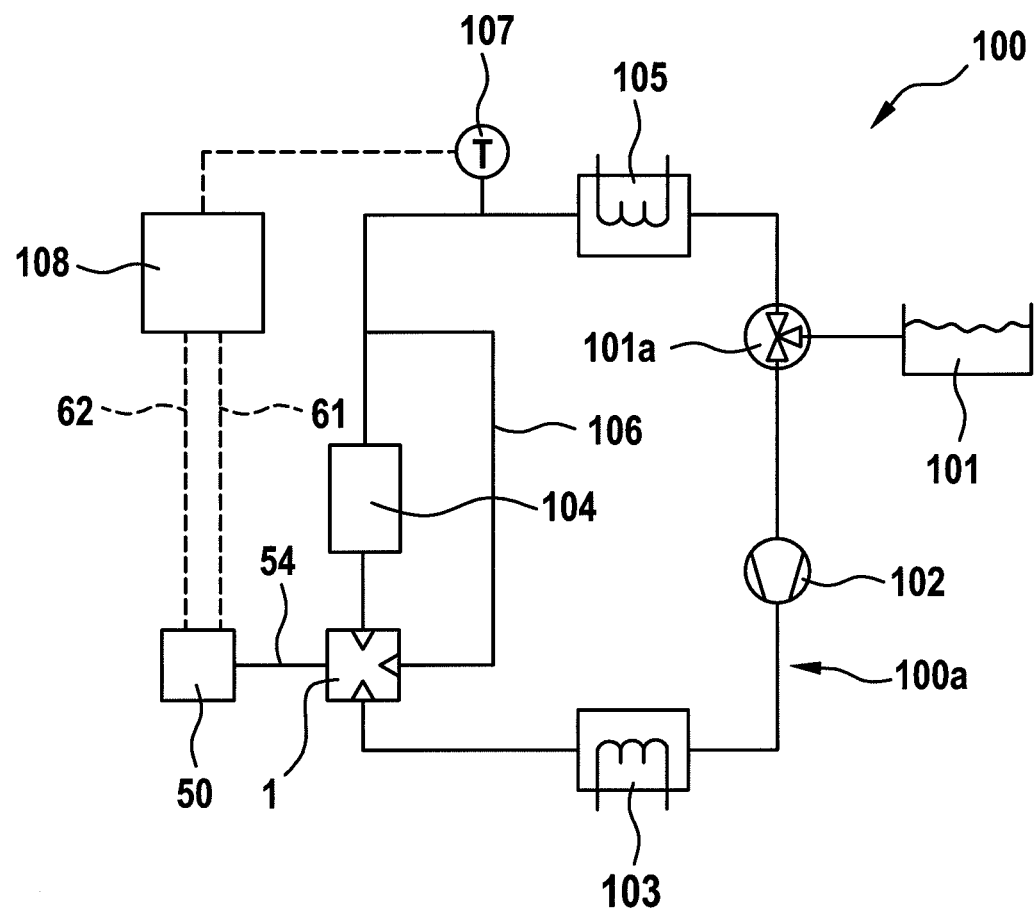
FIG. 5 shows diagrammatically the gate valve according to the invention inside a waste heat recovery system.

FIG. 5 shows a waste heat recovery system 100 of an internal combustion engine 110 (not shown).

The waste heat recovery system 100 has a circuit 100a for conducting a working medium, which in the flow direction of the working medium comprises a feed fluid pump 102, an evaporator 103, an expansion machine 104 and a condenser 105. The working medium may be fed as required via a takeoff line and a valve arrangement 101a from a collection tank 101 into the circuit 100a. The collection tank 101 may alternatively also be integrated in the circuit 100a.

The evaporator 103 is connected to an exhaust gas line of the internal combustion engine and thus uses the thermal energy of the exhaust gas of the internal combustion engine.

According to the invention, the gate valve 1, formed as a 3-way valve, is used as a bypass valve for the expansion machine 104. For this, a bypass line 106 is arranged parallel to the expansion machine 104. Depending on the operating state of the internal combustion engine and parameters resulting therefrom, for example temperatures of the working medium, the working medium is either supplied to the expansion machine 104 or bypasses the expansion machine 104 through a bypass line 106. For example, a temperature sensor 107 is arranged upstream of the condenser 105. The temperature sensor 107 determines the temperature of the working medium upstream of the condenser 105 and transmits a corresponding signal to a control unit 108. Depending on various data such as e.g. the temperature of the working medium upstream of the condenser 105, the control unit 108 actuates the control unit 50 via the two electrical connections 61, 62.

The control unit 50 is connected to the gate valve 1 via the connecting line 54. The gate valve 1 is switched such that the working medium is either conducted through the expansion machine 104 or through the bypass line 106. The mass flow of the working medium may also be divided so that part of the working medium is conducted to the expansion machine 104 and a further part to the bypass line 106.

The embodiments of the gate valve 1 according to the invention are ideal for use in a waste heat recovery system 100 of an internal combustion engine, since high mass flows of the working medium occur there. The efficiency of the entire waste heat recovery system 100 is increased because the pressure losses on flow through the gate valve 1 are minimized.

What is claimed is:

1. A gate valve (1) with a valve casing (4) and a closing body (3) arranged longitudinally movably in the valve casing (4), wherein an inlet channel (5) and an outlet channel (6) are formed in the valve casing (4), wherein the closing body (3) via longitudinal movement cooperates with a valve seat (8) formed in the valve casing (4) and hence opens and closes a hydraulic connection between the inlet channel (5) and the outlet channel (6), characterized in that the inlet channel (5) and the outlet channel (6) are each formed as a spiral, and wherein a continuous bore (12) is formed in the closing body (3), wherein the continuous bore (12) is hydraulically connected to the inlet channel (5) so that the end faces (13, 14) on each side of the closing body (3) are loaded with a hydraulic pressure of the inlet channel (5).

2. The gate valve (1) according to claim 1, characterized in that the hydraulic connection comprises a peripheral groove (30) formed on the closing body (3).

3. The gate valve (1) according to claim 1, characterized in that the flow cross-section through the hydraulic connection is 1.2 to 1.5 times the flow cross-section through the inlet channel (5).

4. The gate valve (1) according to claim 1, characterized in that the spiral forms of the inlet channel (5) and outlet channel (6) run over 360° of the periphery of the closing body (3).

5. The gate valve (1) according to claim 1, characterized in that a further outlet channel (6b) is formed in the valve casing (4), wherein the closing body (3) via longitudinal movement cooperates with a further valve seat (8*b*) formed in the valve casing (4) and hence opens and closes a further hydraulic connection between the inlet channel (5) and the further outlet channel (6*b*), wherein the further outlet channel (6*b*) is formed as a spiral.

6. A waste heat recovery system (100) with a circuit (100*a*) conducting a working medium, wherein the circuit (100*a*) comprises, in the flow direction of the working medium, a pump (102), an evaporator (103), a bypass valve (1), an expansion machine (104) and a condenser (105), wherein a bypass line (106) is arranged in parallel to the expansion machine (104) and wherein the bypass valve (1) controls the mass flow of the working medium to the expansion machine (104) and to the bypass line (106), characterized in that the bypass valve (1) is a gate valve (1) according to claim 1.

7. The waste heat recovery system according to claim 6, characterized in that the hydraulic connection comprises a peripheral groove (30) formed on the closing body (3).

8. The waste heat recovery system according to claim 6, characterized in that the flow cross-section through the hydraulic connection is 1.2 to 1.5 times the flow cross-section through the inlet channel (5).

9. The waste heat recovery system according to claim 6, characterized in that the spiral forms of the inlet channel (5) and outlet channel (6) run over 360° of the periphery of the closing body (3).

10. The waste heat recovery system according to claim 6, characterized in that a further outlet channel (6*b*) is formed in the valve casing (4), wherein the closing body (3) via longitudinal movement cooperates with a further valve seat (8*b*) formed in the valve casing (4) and hence opens and closes a further hydraulic connection between the inlet channel (5) and the further outlet channel (6*b*), wherein the further outlet channel (6*b*) is formed as a spiral.

\* \* \* \* \*